United States Patent

Hagi et al.

[11] Patent Number: 5,967,746
[45] Date of Patent: Oct. 19, 1999

[54] GAS TURBINE INTERSTAGE PORTION SEAL DEVICE

[75] Inventors: Naoki Hagi; Koichi Akagi, both of Takasago, Japan

[73] Assignee: Mitsubishi Heavy Industries, Ltd., Tokyo, Japan

[21] Appl. No.: 09/124,058

[22] Filed: Jul. 29, 1998

[30] Foreign Application Priority Data

Jul. 30, 1997 [JP] Japan .................................. 9-204497

[51] Int. Cl.⁶ ...................................................... F02C 7/28
[52] U.S. Cl. ...................................... 415/174.4; 415/174.5; 277/414
[58] Field of Search ........................... 415/174.5, 173.5, 415/174.4; 277/414, 415

[56] References Cited

U.S. PATENT DOCUMENTS

| | | | |
|---|---|---|---|
| 1,831,242 | 11/1931 | Hanzlik | 415/174.5 X |
| 1,857,961 | 5/1932 | Lamb | 415/174.4 X |
| 4,420,161 | 12/1983 | Miller | 415/174.5 X |
| 4,477,089 | 10/1984 | Hoffman et al. | 277/414 |
| 5,029,876 | 7/1991 | Orlando et al. | 415/174.5 X |
| 5,096,376 | 3/1992 | Mason et al. | 415/174.5 X |
| 5,215,435 | 6/1993 | Webb et al. | 277/414 |
| 5,290,144 | 3/1994 | Kreitmeier | 415/173.1 |
| 5,314,304 | 5/1994 | Wiebe | 415/174.4 X |
| 5,333,993 | 8/1994 | Stueber et al. | 415/174.5 X |
| 5,358,374 | 10/1994 | Correia et al. | |
| 5,487,549 | 1/1996 | Dalton et al. | 415/174.5 X |
| 5,599,026 | 2/1997 | Sanders et al. | 415/174.4 X |
| 5,890,873 | 4/1999 | Willey | 415/173.5 |

FOREIGN PATENT DOCUMENTS

| | | | |
|---|---|---|---|
| 3940607 A1 | 6/1990 | Germany | 415/174.5 |
| 4-101004 | 4/1992 | Japan | 415/174.5 |
| 6-280615 | 10/1994 | Japan . | |

*Primary Examiner*—John E. Ryznic
*Attorney, Agent, or Firm*—Wenderoth Lind & Ponack, L.L.P.

[57] ABSTRACT

In order to realize a seal device of a gas turbine interstage portion which is excellent in a sealing ability during regular operation of the gas turbine, a gas turbine interstage portion seal device is constructed comprising a honeycomb seal (2) of a ring shape provided to an inner side of a turbine stationary blade inner ring (1) and a plurality of seal fins (5) of a ring shape provided to an outer side of a turbine disc seal arm portion (4). Also, an inner side surface of the honeycomb seal and outer peripheries of the plurality of seal fins, comprise large diameters and small diameters, and convex and concave portions formed thereby respectively are mated with each other.

4 Claims, 2 Drawing Sheets

GAS TURBINE INTERSTAGE PORTION SEAL DEVICE

BACKGROUND OF THE INVENTION

1. Field of the Invention

The present invention relates to a gas turbine interstage portion seal device.

2. Description of the Prior Art

A gas turbine stationary blade inner side interstage portion seal in the prior art is carried out, as shown in FIG. 2, with a labyrinth seal fin 52 provided to a stationary side (that is, a stationary blade inner ring 51) and a step seal 54 provided to a rotary side (that is, a turbine disc seal arm portion 53).

In the gas turbine interstage portion seal system using the labyrinth seal fin 52 and step seal 54, while fluid passes through the labyrinth (throttle) portion, it flows through narrow gaps and wider gaps in turn to be pressure-reduced by the throttle effect, and generally in a rotating shaft of rotary machine, this seal system is used when the fluid for sealing is a compressible gas or steam.

It is to be noted that the labyrinth seal 52 exhibits by nature its effect while the rotary machine is in operation and its sealing ability is not necessarily good in a state out of operation.

In order to minimize gas turbine interstage portion gas leakage, the stage number of the labyrinth seal fin 52 may be increased or the gap between the stationary side and the rotating shaft may be reduced. But if the stage number is increased, it leads to elongation of the rotating shaft, resulting in a problem in the strength of the rotating shaft. If the gap is too small, the rotating shaft will come in contact with the stationary side due to thermal expansion when there is run-out of the rotating shaft.

Therefore, the seal fin 52 is made of a soft material and is worked to form a sharp edge at its end in consideration that if contact occurs, the seal fin 52 wears quickly so that the rotating shaft may not be damaged.

The prior art gas turbine interstage portion seal, as mentioned above, is carried out with the labyrinth seal fin provided on the stationary side and the step seal provided on the rotary side.

In the case of this seal system, considering quickness of thermal expansion on the rotary side when the temperature of the stationary side is low at start-up time, it is necessary to make the gap wider in advance to avoid contact of both these sides. If the gap between both sides is made wider, however, it will cause a lowering of the sealing ability in the regular operation, resulting in increase of loss of leakage, and an this is one of the factors to lower the gas turbine performance.

SUMMARY OF THE INVENTION

With an object of resolving the above-mentioned problem, the present invention provides a gas turbine interstage portion seal device provided between a turbine stationary blade inner ring and a turbine disc seal arm portion in a gas turbine interstage portion. A honeycomb seal of a ring shape is provided to an inner side of the turbine stationary blade inner ring, and a plurality of a seal fins of ring shape are provided to an outer side of the turbine disc seal arm portion.

In the present invention, even if the honeycomb seal and the seal fins come in contact with each other while the gas turbine is in operation, a portion of the honeycomb seal is scraped off only the and there is little influence given on the subsequent operation of the gas turbine. Therefore, there is no need to provide a large gap between the honeycomb seal and the seal fins in consideration of quickness the of thermal expansion on the rotary side at the time of start-up of the gas turbine, and an excellent sealing ability becomes possible to be maintained through the regular operation.

In the gas turbine interstage portion seal device as mentioned above, it is preferable that an inner side surface of said the honeycomb seal comprises large diameter surfaces and small diameter surfaces. Outer peripheries of the plurality of seal fins comprise large diameter peripheries and small diameter peripheries and convex and concave portions on the inner side surface of said honeycomb seal and convex and concave portions of the outer peripheries of said plurality of seal fins are mated with each other irregularly, then the influence given on the seal effect by the contact of the honeycomb seal and the seal fins can be reduced.

In the present invention, because the contact of the inner side surface of the honeycomb seal and the outer peripheries of the seal fins is done portionally only, the frictional resistance is small and the generation of the frictional heat can be suppressed.

BRIEF DESCRIPTION OF THE DRAWINGS

FIG. 1 is an explanatory view of a gas turbine interstage portion seal device of one embodiment according to the present invention, wherein FIG. 1(a) is a cross sectional side view and FIG. 1(b) is a partially enlarged perspective view.

DESCRIPTION OF THE PREFERRED EMBODIMENTS

A gas turbine interstage portion seal device of one embodiment according to the present invention will be described with reference to FIG. 1.

Figure 1:
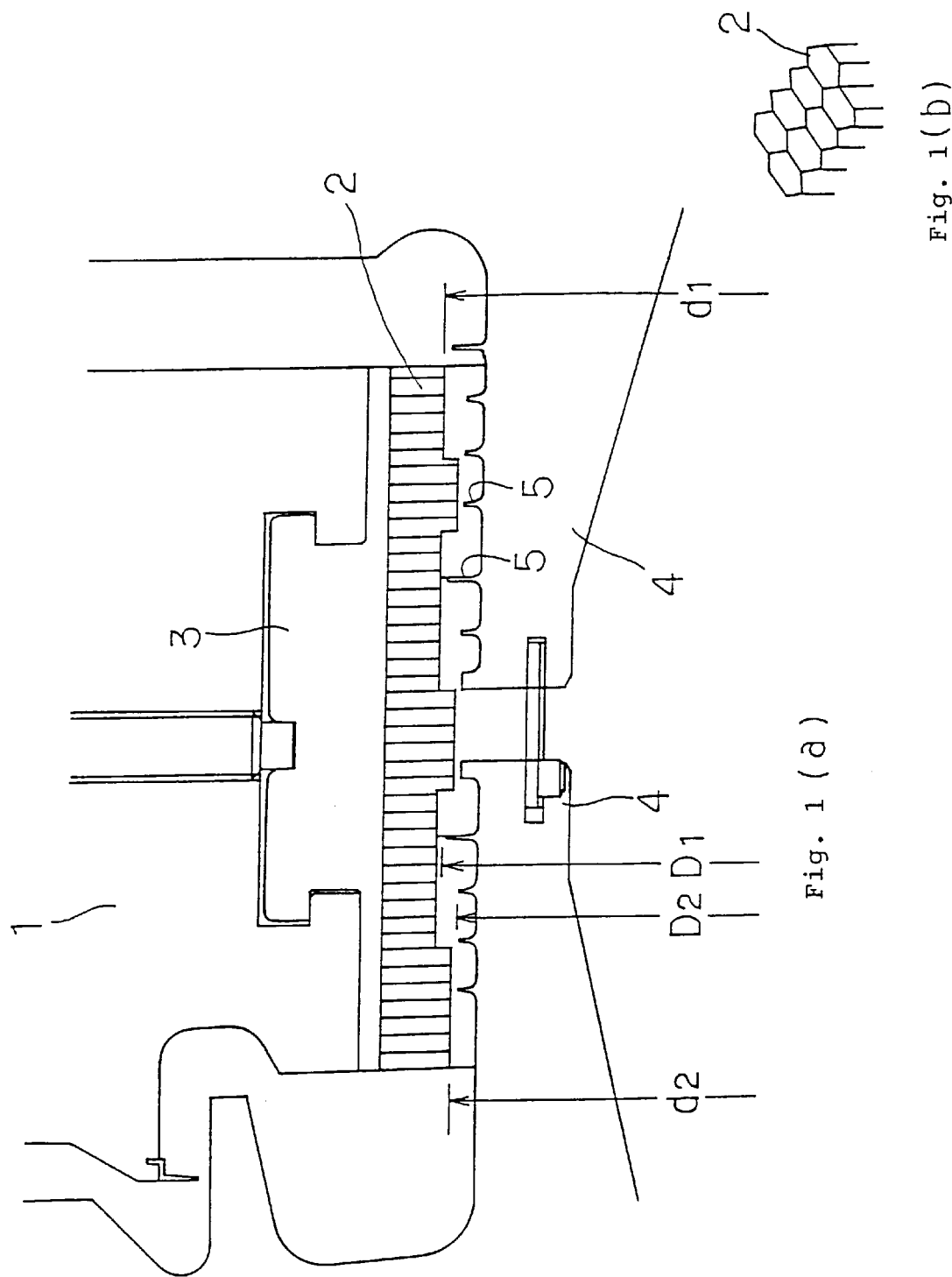
Figure 2:
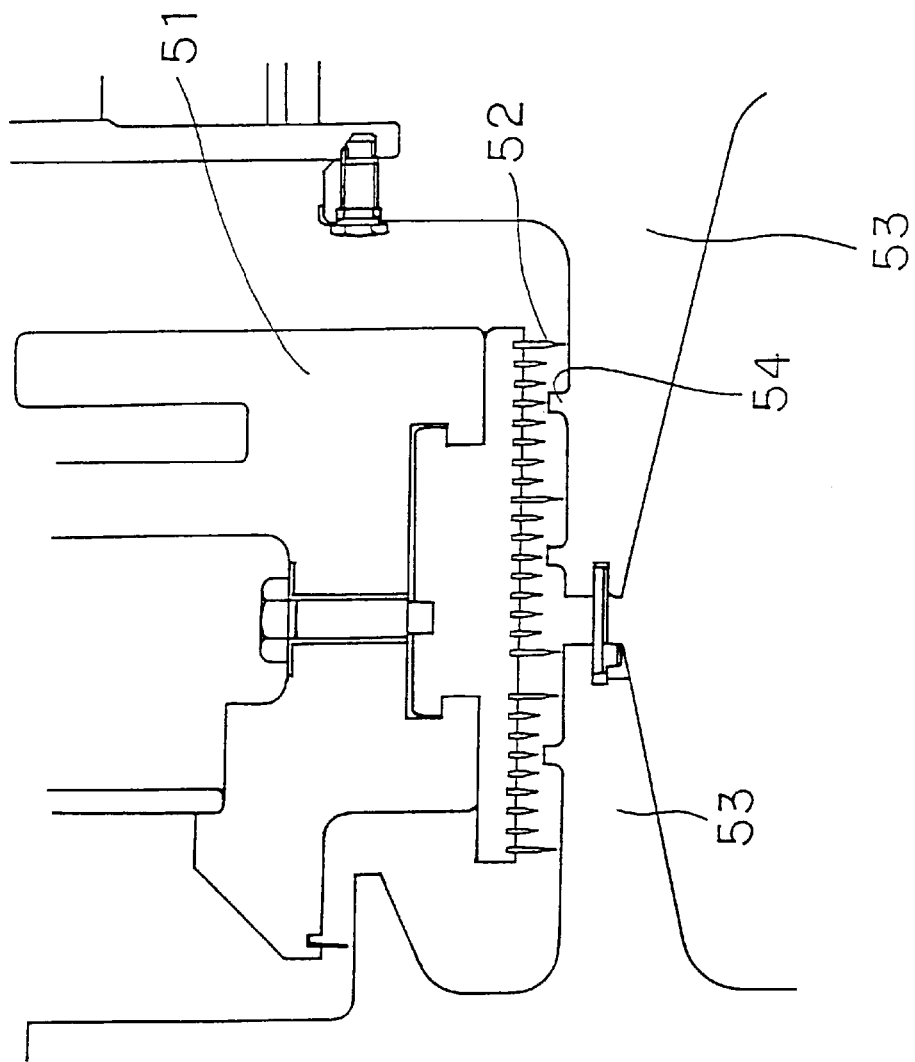
FIG. 2 is an explanatory view of a prior art gas turbine interstage portion seal device.

In the seal device of the embodiment shown in FIG. 1, there are provided a honeycomb ring 3 fitted to an inner side of a gas turbine stationary blade inner ring 1, a honeycomb seal 2 of honeycomb shape fitted to an inner side of the honeycomb ring 3 and a plurality of seal fins 5 formed integrally with a turbine disc seal arm portion 4 so as to be fitted to an outer side of the turbine disc seal arm portion 4.

An inner side surface of the honeycomb seal 2 comprises large diameter surfaces and small diameter surfaces which locate at distances $d_1$ and $d_2$, respectively, from a gas turbine rotational axis center so that convex and concave portions are formed on the inner side surface of the honeycomb seal 2. Also, outer peripheries of the plurality of seal fins 5 formed integrally with the turbine disc seal arm portion 4 comprise large diameter peripheries and small diameter peripheries which locate at distances $D_1$ and $D_2$, respectively, from the gas turbine rotational axis center so that convex and concave portions are formed on the outer peripheries of the plurality of seal fins 5. And the convex and concave portions of the honeycomb seal 2 and the convex and concave portions of the seal fins 5 are mated with each other irregularly.

The large diameter surfaces and small diameter surfaces which define concave and convex seal portions, respectively, on the inner side surface of the honeycomb seal are thus irregularly positioned with respect to the convex and concave fin portions defined by the large diameter peripheries and small diameter peripheries of the outer peripheries of the seal fins, respectively. For example, at least one of the large diameter surfaces of the honeycomb seal is positioned opposite to both large diameter peripheries and small diameter peripheries of the plurality of seal fins 5, as can be seen in FIG. 1(a). Indeed, this is true for two of the large diameter surfaces of the honeycomb seal. Accordingly, the radial distance between the outer peripheries of the plurality of seal fins and the inner side surfaces of the honeycomb seal varies.

In the above, even if the honeycomb seal 2 provided to the stationary side and the seal fins 5 provided to the rotary side come in contact with each other while the gas turbine is in operation, a portion of the honeycomb seal 2 which has contacted the seal fins 5 is scraped off only and there is little influence given on the subsequent operation of the gas turbine.

Thus, there is no need of providing a large gap between the honeycomb seal 2 and the seal fins 5 in consideration of quickness of thermal expansion on the rotary side at the time of start-up of the gas turbine and an excellent sealing ability has become possible to be maintained through the regular operation.

Further, the inner side surface of the honeycomb seal 2 comprises the large diameter surfaces and small diameter surfaces so as to form the concave and convex portions thereon. The outer peripheries of the plurality of seal fins 5 also comprise the large diameter peripheries and small diameter peripheries so as to form the convex and concave portions thereof. The convex and concave portions of the honeycomb seal 2 and the seal fins 5 are mated with each other irregularly, whereby even if the honeycomb seal 2 makes contact with the seal 5, no complete contact occurs, only partial contact, and there is less frictional resistance, which results in the suppression of generation of frictional heat. Further, because the fluid throttle portion is formed by the honeycomb seal 2 and the seal fins 5, the throttle effect can be sufficiently maintained.

According to the gas turbine interstage portion seal device of the present invention, there are provided the honeycomb seal of a ring shape to the inner side of the turbine stationary blade inner ring and the plurality of seal fins of a ring shape to the outer side of the turbine disc seal arm portion, whereby even if the honeycomb seal and the seal fins come in contact with each other while the gas turbine is in operation, a portion of the honeycomb seal is scraped off only the and there is little influence given on the subsequent operation of the gas turbine. Thus the gap between the honeycomb seal and the seal fins can be made narrower so that an excellent sealing ability becomes possible to be maintained through the regular operation of the gas turbine and enhancement of the gas turbine performance becomes possible.

Also, according to the gas turbine interstage portion seal device constructed such that the inner side surface of the honeycomb seal and the outer peripheries of the plurality of seal fins, respectively, comprise large diameter ones and small diameter ones, and convex and concave portions formed thereby respectively are mated with each other irregularly, the contact of the inner side surface of the honeycomb seal and the outer peripheries of the seal fins is done portionally only, and hence the generation of frictional heat can be suppressed.

It is understood that the invention is not limited to the particular construction and arrangement herein illustrated and described but embraces such modified forms thereof as come within the scope of the following claims.

What is claimed is:

1. A gas turbine interstage portion seal device provided between a turbine stationary blade inner ring and a turbine disc seal arm portion in a gas turbine interstage portion, comprising:

a honeycomb seal of a ring shape provided to an inner side of said turbine stationary blade inner ring, said honeycomb seal having an inner side surface which comprises large diameter surfaces and small diameter surfaces which define concave and convex seal portions, respectively; and a plurality of seal fins of a ring shape provided to an outer side of said turbine disc seal arm portion, said plurality of seal fins comprising outer peripheries including large diameter peripheries and small diameter peripheries which define convex and concave fin portions, respectively;

wherein said large diameter peripheries and said small diameter peripheries of said plurality of seal fins are irregularly positioned with respect to said large diameter surfaces and said small diameter surfaces of said inner side surface of said honeycomb seal such that said concave and convex seal portions are irregularly positioned with respect to said convex and concave fin portions.

2. The gas turbine interstage portion of claim 1, wherein at least one of said large diameter surfaces of said honeycomb seal is positioned opposite to both large diameter peripheries and small diameter peripheries of said plurality of seal fins.

3. The gas turbine interstage portion of claim 1, wherein said large diameter surfaces of said honeycomb seal are positioned opposite to both large diameter peripheries and small diameter peripheries of said plurality of seal fins.

4. The gas turbine interstage portion of claim 1, wherein the radial distance between said outer peripheries of said plurality of seal fins and said inner side surface of said honeycomb seal varies.

* * * * *